US012616966B2

(12) United States Patent
Navalón Oltra et al.

(10) Patent No.: US 12,616,966 B2
(45) Date of Patent: May 5, 2026

(54) METAL ORGANIC FRAMEWORK AND USE THEREOF FOR GENERATING $H_2$

(71) Applicants: PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR); ECOLE NORMALE SUPERIEURE, Paris (FR)

(72) Inventors: Sergio Navalón Oltra, Valencia (ES); Cristina Vallés García, Valencia (ES); María Cabrero Antonino, Valencia (ES); Hermenegildo García Gómez, Valencia (ES); Christian Serre, Paris (FR); Georges Mouchaham, Paris (FR); Lin Zhou, Zhejiang (CN)

(73) Assignees: PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR); ECOLE NORMALE SUPERIEURE, Paris (FR)

( * ) Notice: Subject to any disclaimer, the term of this patent is extended or adjusted under 35 U.S.C. 154(b) by 473 days.

(21) Appl. No.: 18/030,383

(22) PCT Filed: Oct. 5, 2021

(86) PCT No.: PCT/EP2021/077404
§ 371 (c)(1),
(2) Date: Apr. 5, 2023

(87) PCT Pub. No.: WO2022/073979
PCT Pub. Date: Apr. 14, 2022

(65) Prior Publication Data

US 2024/0024861 A1 Jan. 25, 2024

(30) Foreign Application Priority Data

Oct. 5, 2020 (EP) .................................... 20382882

(51) Int. Cl.
*B01J 31/16* (2006.01)
*B01J 35/00* (2006.01)
(Continued)

(52) U.S. Cl.
CPC .......... *B01J 31/1691* (2013.01); *B01J 35/19* (2024.01); *B01J 35/39* (2024.01); *C01B 3/042* (2013.01);
(Continued)

(58) Field of Classification Search
None
See application file for complete search history.

(56) References Cited

PUBLICATIONS

Dhakshinamoorthy et al., "Catalysis and Photocatalysis by Metal Organic Frameworks", Journal, 2018, p. 8134-8172, vol. 47, No. 22, Royal Society of Chemistry Review.
Li et al., "Oxidase-like MOF-818 Nanozyme with High Specificity for Catalysis of Catechol Oxidation", Journal, 2020, p. 15569-
(Continued)

*Primary Examiner* — Yun Qian
(74) *Attorney, Agent, or Firm* — Hayes Soloway PC

(57) ABSTRACT

The present invention relates to metal-organic frameworks (MOFs) which contain trimetallic centres with pyrazole as a ligand in the structure thereof. Particularly, it relates to MOFs which contain units of formula (I). The present invention also relates to a photocatalytic method for generating H2 starting from liquid water or vapour using said materials.

Formula (I)

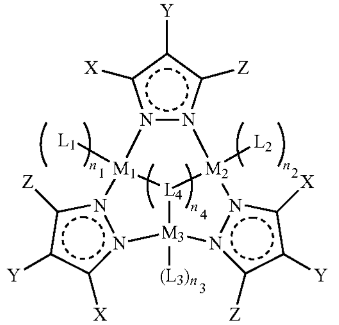

9 Claims, 1 Drawing Sheet

(51) Int. Cl.
*B01J 35/39* (2024.01)
*C01B 3/042* (2026.01)

(52) U.S. Cl.
CPC ................. *C01B 2203/1052* (2013.01); *C01B 2203/1076* (2013.01)

(56) References Cited

PUBLICATIONS 15574, vol. 142, No. 36, Journal of the American Chemical Society.
Liu et al., “Mesoporous Cages in Chemically Robust MOFs Created by a Large Number of Vertices with Reduced Connectivity”, Journal, 2018, p. 488-496, vol. 141, No. 1, Journal of the American Chemical Society.

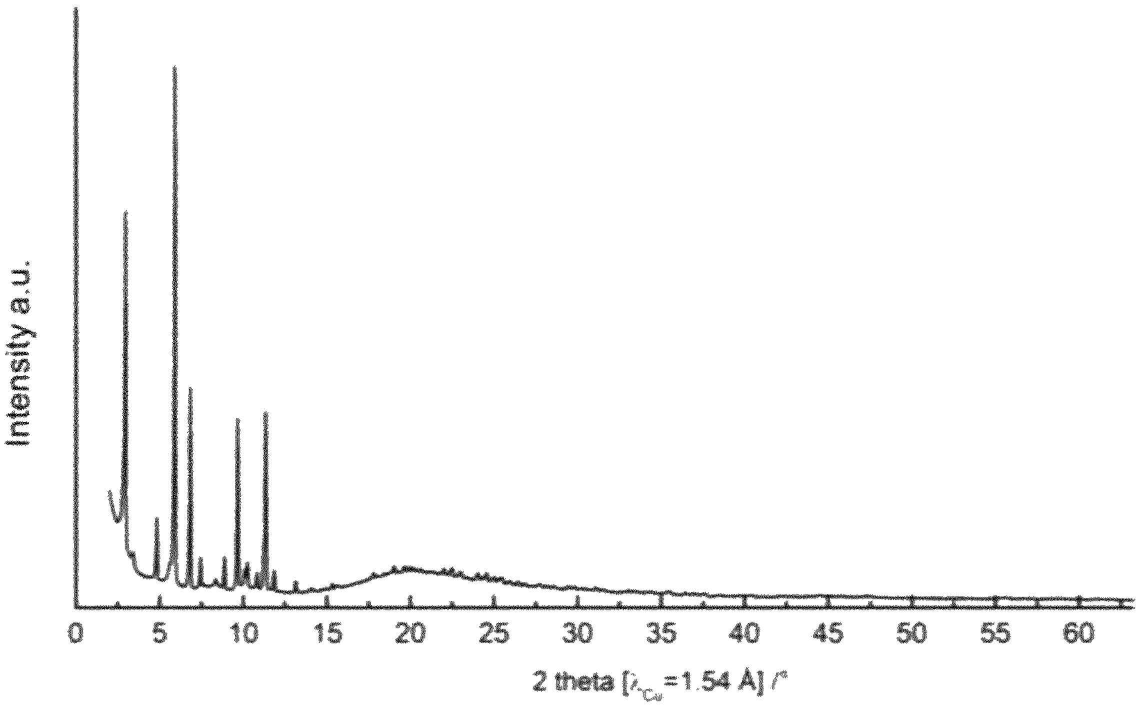
Intensity a.u.
0
5
10
15
20
25
30
35
40
45
50
55
60
2 theta [λ_Cu = 1.54 Å] /°

METAL ORGANIC FRAMEWORK AND USE THEREOF FOR GENERATING $H_2$

CROSS-REFERENCE TO RELATED APPLICATIONS AND PRIORITY

This patent application claims priority from PCT Application No. PCT/EP2021/077404 filed Oct. 5, 2021, which claims priority from European Patent Application No. 20382882.7 filed Oct. 5, 2020.

The present invention describes metal-organic frameworks which contain ligands (or connectors between metal nodes) formed by trimetallic centres linked to pyrazole in the structure thereof, as well as the use thereof for generating $H_2$ under exposure to sunlight.

STATE OF THE ART

Metal-organic frameworks (MOFs) are crystalline and porous materials the structure of which is formed by nodes which contain one or more metal atoms that are linked by coordination bonds and coulombic interactions with rigid organic ligands. The metal nodes of those MOFs which are made up by units of $M_6O_4(OH)_4^{12-}$ are known in the state of the art, wherein M is a tetrapositive metal cation such as for example $Zr^{+4}$, $Ce^{4+}$ and $Hf^{4+}$ and the organic ligands are tricarboxylic aromatic compounds such as trimesic acid and 1,3,5- (4-carboxyphenyl)benzene (Liu, Q. et al. Mesoporous Cages in Chemically Robust MOFs Created by a Large Number of Vertices with Reduced Connectivity. *Journal of the American Chemical Society* 2019, 141, 488-496). These components define a porous structure that corresponds to a solid with an X-ray diffraction such as that indicated in FIG. 1 accompanying this document. These MOFs materials possess different properties that derive from the surface area and composition thereof, among which are the high gas adsorption capacity and catalytic activity thereof.

More directly related to the present invention, it is known in the state of the art that some MOF materials exhibit photocatalytic activity when these materials are irradiated with photons the wavelength of which corresponds to the UV-Visible or near-IR region, capable of promoting chemical reactions. A particular case of the use of MOFs as photocatalysts relates to the case in which the source of irradiation is natural sunlight that reaches the earth's surface. The spectrum of solar radiation on the earth's surface corresponds to a photon distribution with wavelengths in the UV region greater than 380 nm which corresponds to around 4% of the total energy, in addition to photons in the visible region between 400 and 800 nm which contributes approximately 48%, to solar energy and to the rest of lower energy photons in the near-IR area.

Among the photocatalytic reactions that have been described for MOF-type metal-organic materials, of special relevance in the present invention, is the generation of $H_2$ by irradiation of these materials in contact with water, either in liquid or vapour phase. A particular case for which there are few precedents is the photocatalytic generation of $H_2$ using distilled water, fresh water or seawater and $H_2$ and $O_2$ are simultaneously generated in the amounts corresponding to the water composition. Processes of this type are known in the state of the art as photocatalytic water splitting and the evidence described indicates that water behaves simultaneously as an electron donor and acceptor compound. The reaction that takes place in the photocatalytic water splitting is indicated in the following equation which also includes the enthalpy variation of the process.

$$H_2O \rightarrow H_2 + \tfrac{1}{2}O_2 \quad \Delta H = +285.85\ kJ$$

In the context of non-fossil-fuel based renewable energies, the above reaction can serve as a way to transform sunlight as a primary source of energy into chemical energy, specifically into $H_2$ which can be used as an energy vector in fuel cells or in combustion systems. Additionally, $H_2$ can serve as a chemical reagent in hydrogenation or reduction reactions.

Nevertheless, despite the potential of the photocatalytic generation of $H_2$ starting from $H_2O$, the situation in the state of the art describes MOF materials having a very poor and still insufficient efficiency to be used in any industrial process (A. Dhakshinamoorthy, Z. Li, H. Garcia., Catalysis and photocatalysis by metal organic frameworks, *Chem. Soc. Rev.* 2018, 47, 8134-8172). Furthermore, the MOF-type photocatalysts described need noble metals and particularly platinum to increase the photocatalytic performance thereof in the generation of $H_2$. As platinum is a high-priced metal, the inclusion thereof in MOF materials makes the material significantly more expensive and reduces the economic attractiveness of the process. Additionally, the photocatalytic activity of the MOF materials described to date decreases considerably below 50% of the efficiency thereof when the radiation is exclusively carried out with visible light and not with ultraviolet light, so the solar radiation of these materials is very inefficient.

In view of the state of the art, it is considered important to develop MOF materials as photocatalysts for the efficient generation of $H_2$ in which the presence of noble metals in the composition thereof are not necessary and the photocatalytic response of which are derived mainly from irradiation in the visible or near-IR area of the electromagnetic spectrum.

DESCRIPTION OF THE INVENTION

The inventors of the present invention have demonstrated that MOF materials containing units formed by trimetallic centres linked to pyrazole (as represented in formula (I) indicated below) in the structure thereof possess photocatalytic activity for water splitting into $H_2$ and $O_2$ by radiation with sunlight.

Said units formed by trimetallic centres linked to pyrazole act as ligands or connectors between the metal nodes of the material's structure, each unit coordinating with three metal nodes of said structure by means of coordination bonds and/or coulombic interactions.

Thus, a first aspect of the invention relates to the use of a metal-organic framework as a catalyst for the photocatalytic production of hydrogen starting from water characterised in that it comprises units of formula (I) in the structure thereof:

Formula (I)

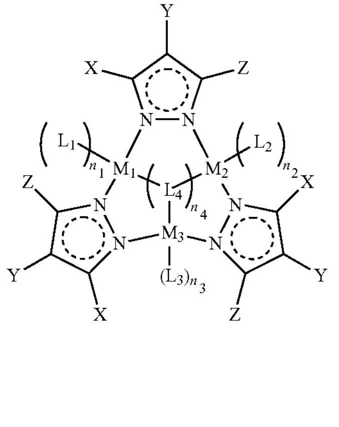

wherein $M_1$ $M_2$ and $M_3$ are metal cations selected from the list comprising: Co and Cu and wherein $M_1$, $M_2$ and $M_3$ are equal to each other;

X is a substituent selected from the list comprising: H, $CH_3$, $OCH_3$, $SO_3^-$, F, Cl, Br, I, $NH_2$ and $CF_3$;

Y is $COO^-$;

Z is a substituent selected from the list comprising: H, CHs, $OCH_3$, $SO_3^-$, F, Cl, Br, I, $NH_2$ and $CF_3$;

$L_1$, $L_2$, $L_3$ and $L_4$ are groups independently selected from the list comprising: $O^{2-}$, $OH^-H_2O$ and halide, $n_1$, $n_2$, $n_3$ and $n_4$ are numbers independently selected from 0 or 1, Formula (I) will comprise the $L_1$, $L_2$, $L_3$ and $L_4$ groups needed (from zero, it would be the case wherein $n_1$, $n_2$, $n_3$ and $n_4$ are all zero, up to four, it would be the case wherein $n_1$, $n_2$, $n_3$ and $n_4$ are all 1) to compensate for the charge of the metal cations.

The term "halide" is related to $F^-$, $Cl^-$, $Br^-$ or $I^-$.

In a particular embodiment, X and Z are H.

In a particular embodiment $L_1$, $L_2$, $L_3$ and $L_4$ are independently selected from $Cl^-$ and $OH^-$.

In a preferred embodiment $M_1$, $M_2$ and $M_3$ are Cu cations; X and Z are H, Y is —$CO_2H$ and $L_1$, $L_2$ and $L_3$ is $Cl^-$ and $L_4$ $OH^-$ or $O^{2-}$ or is not present.

In a particular embodiment, the material contains up to 30% by weight of $L_1$, $L_2$ and $L_3$ groups selected from: acetate, benzoate, pyridinecarboxylate or combinations thereof.

The material used in the present invention has an X-ray diffractogram as shown in FIG. 1.

These units of formula (I) act in the MOF as tricarboxylic organic ligands of the type similar to trimesic acid discussed in the section on the state of the art and coordinate with metal nodes. Among the metallic nodes with which it can be coordinated are $(Zr_6O_4(OH)_4)^{12+}$, $(Hf_6O_4(OH)_4)^{12+}$, other known nodes in the state of the art being also possible. Preferably, the nodes are units of $(Zr_6O_4(OH)_4)^{12+}$.

Additionally, in these nodes it is possible to replace one or more metal cations with other metals. Thus, for example, it is possible to have combinations of six cations wherein one more of the $Zr^{4+}$ cations of the node $(Zr_6O_4(OH)_4)^{12+}$ has been replaced by $Ce^{4+}$ or $Ti^{4+}$ or combinations thereof. Similarly, the other metal nodes can contain two or more different metals.

The use of the present invention is also related to MOF materials containing units (ligands) of formula (I) in combination with another tricarboxylic ligand which possesses similar molecular dimensions. The proportion of units (ligands) of formula (I) can vary between 15% and 100%, in moles with respect to the total of ligands, being more preferable between 10% and 25% in moles with respect to the total of ligands. By way of non-limiting examples of possible ligands that can be present, in addition to the units of formula (I), are polycarboxylic aromatic acids such as tris(4-carboxyphenyl)methane, tris(4-carboxyphenyl)amine and 1,3,5-tris(4-carboxyphenyl)benzene.

In a preferred embodiment, metal-organic framework is:

$$[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2,$$

wherein PyC refers to Py-4-$CO_2$.

In another preferred embodiment, the metal-organic framework is:

$$[Hf_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$$

wherein PyC refers to Py-4-$CO_2$.

" "

In another preferred embodiment, the metal-organic framework is:

$$[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$$

wherein PyC refers to Py-4-$CO_2$.

In another preferred embodiment, the material used in the present invention contains one or more species housed in the pores which act as cocatalysts favouring the $H_2$ photocatalytic generation reaction. Said cocatalysts can be:

nanoparticles of the metals platinum, gold, iridium, silver, rhodium and nickel, palladium and combinations thereof, nanoparticles of metal oxides that are selected from cobalt, copper, ruthenium, molybdenum, strontium, zirconium and combinations thereof.

Nanoparticles of metal chalcogenides based on sulphides, selenides or tellurides combined with molybdenum, cadmium, zinc, lead, indium, copper, tungsten and combinations thereof.

Metal complexes wherein the metal is chrome, manganese, iron, cobalt, nickel, copper, ruthenium, rhodium, palladium, silver, platinum and iridium and the organic ligand contains amine-, imine- or heterocyclic-type nitrogen atoms, and combinations thereof.

The term "nanoparticle" according to the present invention relates to particles with dimensions between 10-100 nm.

In a preferred embodiment, the material used in the present invention contains 1% by weight of platinum and 1% by weight of ruthenium oxide as cocatalysts housed inside the pores thereof (the pores have a size between 0.5 and 5 nm).

These MOF materials containing in their composition the unit of formula (I) can be made up by particles of micrometric size or smaller in size on the nanometre scale. They can also have defined geometric shapes, as octahedrons and as cuboids or irregular morphology, these materials can also have a high aspect ratio between lateral dimensions and thickness.

In an unexpected way that cannot be deduced from the state of the art, these materials containing the unit of formula (I) exhibit high photocatalytic activity in water splitting that exceeds by more than one order of magnitude the activity known in the state of the art for other MOFs. Similarly to the centre of evolution of $O_2$ in the natural photosynthetic systems present in green plants, the unexpected photocatalytic activity of the materials described herein could derive from the cooperative effect of the three metal ions in the centres of formula (I). Thus, successively, photon energy could promote consecutive changes in the oxidation state of the three metal ions coordinated with the same O atom and by means of protonation and deprotonation processes they would facilitate the evolution of $O_2$.

The present invention further relates to a photocatalytic method for producing hydrogen starting from water which comprises contacting a metal-organic framework, as described in the first aspect of the invention, with water in liquid or vapour state and in the presence of light, preferably sunlight.

All the preferred embodiments of the material indicated in the first aspect of the invention are also applicable to this aspect of the invention relating to the photocatalytic method.

The photocatalytic generation of $H_2$ by irradiation of the MOF materials containing the unit of formula (I) can be carried out by suspending the appropriate amount of the material in an aqueous medium and exposing the suspension to the direct action of the solar rays. The aqueous medium can be distilled water with an ionic conductivity equal to or less than $10\times10^{-6}$ $W^{-1}\cdot m^{-1}$ or another type of natural water from rivers and wells or even seawater and brackish water. The reaction must be carried out in a closed container that enables the collection and convenient separation or treatment of the gases formed. The reaction can be carried out at ambient temperature higher or lower than 25° C. Alternatively, the radiation can be carried out by exposing MOF-based photocatalyst films to water vapours. The reaction can be equally carried out with natural or concentrated sunlight using mirrors, lenses or other optical devices. Radiation can also be carried out by artificial light that possesses different wavelengths, either in the ultraviolet, visible, or near infrared region, as well as combinations thereof. Irradiation sources can be incandescent or discharge lamps, as well as light emitting diodes. The radiation can further be monochromatic, such as for example, those coming from laser sources.

Irradiation can be carried out by contacting the photocatalyst with water in the liquid or vapour phase. The MOF containing formula (I) can be dispersed in suspension in the fluid, both liquid and vapour, or be immobilised in the form of a film or coating. The reaction can be carried out at a temperature of 25° C. or higher or lower within the thermal stability range of the material up to 150° C.

Irradiation can be carried out both at atmospheric pressure and at lower or higher pressures between 0.01 and 5 MPa. Radiation can be carried out both by means of a batch method, wherein a certain amount of water is introduced and left for a time for the transformation to occur, and continuously, wherein the water in liquid or vapour phase flows in contact with the photocatalyst.

In a preferred embodiment of the method, the material of the present invention is deposited in the form of a thin film between 1 and 20 microns thick and a bed of water between 0.5 and 12 cm thick is made to flow over said film at a temperature between 4 and 40° C. and at a rate of between 0.1 and 2 ml/h, said film being exposed to sunlight or artificial light.

In another preferred embodiment, the material of the present invention is deposited in the form of a thin film several microns thick and a flow of water vapour at a temperature between 10° and 150° C. is made to flow over said film at a rate of between 0.1 and 2 ml/h and wherein said film is exposed to sunlight or artificial light.

A final aspect of the present invention relates to a metal-organic material characterised in that it comprises units of formula (I) in the structure thereof, as described in the present invention, with the proviso that the material does not comprise the formula:

$$[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$$

"PyC" refers to Py-4-$CO_2$.

All the preferred embodiments of the material indicated in the first aspect of the invention are also applicable to this last aspect of the invention related to the material itself.

Material Characterisation:

The materials object of the present invention are crystalline and porous solids of the type of the so-called metal-organic frameworks that contain units of formula (I) in the structure thereof, being able to further contain cocatalysts housed inside the pores. Therefore, these materials are characterised by a combination of chemical analysis techniques, X-ray diffraction, gas adsorption, spectroscopic measurements.

The chemical analysis of these materials can be carried out after the complete dissolution thereof in appropriate media such as concentrated HF in aqueous medium. After the dissolution of the material, the resulting liquid is subjected to analysis by inductively coupled plasma (ICP), measuring the signal by means of atomic emission spectroscopy (AES) or by means of mass spectrometry, quantifying the signal against a calibration pattern.

The crystallinity and structure thereof of the material is determined by means of the X-ray diffraction pattern wherein the diffraction peaks are recorded at determined angle values and with an intensity that is in accordance with the crystalline structure.

FIG. 1 shows the X-ray diffraction pattern of the material corresponding to the present invention.

The surface area can be determined by means of nitrogen adsorption at a temperature of 77 K, determining the volume amount of this gas adsorbed at different relative pressures. In addition to adsorption, desorption measurements can also be carried out. The micropore volume and the pore dimensions can be established by adjusting the experimental adsorption values to theoretical models (BJH-Barrett—Jolenda—Halenda). Typical values of surface area in the materials of the present invention are between 500 and 2000 $m^2/g^{-1}$.

X-ray photoelectron spectroscopy enables the detection and quantification of the units of formula (I) present in the material, which enables the relative proportion of each atom to be established by means of signal correction.

The materials of the present invention which contain cocatalysts housed inside the pores can be analysed by transmission microscopy techniques wherein the presence of nanoparticles can be observed and the dispersion of the dimensions of these nanoparticles can be determined. Cocatalysts, together with metal nodes containing more than one cation, contribute to increasing the efficiency of the photocatalytic processes of hydrogen and oxygen evolution.

Ultraviolet-visible absorption spectroscopy enables the wavelength of the photons absorbed by the material to be established. These spectrums can be recorded by means of the diffuse reflectance mode wherein the solid material is packed into a sample holder which is placed completing an integrating sphere at the focal point. The interior of this sphere is illuminated with the radiation to be absorbed and the absorbed intensity is determined by comparison with a barium sulphate pattern. Photoresponse and photocurrent measurements enable the establishment of the wavelengths of radiation that lead to the generation of an electrical current between an anode and a cathode connected to an external circuit and immersed in a common electrolytic solution. These photocurrent measurements are carried out by depositing a thin layer of the material comprising the units of formula (I) on a transparent conductive electrode. This electrode is electrically connected with a potentiostat that makes it possible to determine electrical current measurements and eventually subject the electrode to a bias voltage. A working electrode is also connected to the potentiostat, which can be a platinum plate and a reference electrode the potential value of which is known.

The stability of the material against pH values and temperature can be established by dispersing a solid sample thereof in aqueous solutions at known pH that can be subjected to heating between 25 and 100° C., the metal content in solution being measured by elemental analysis against time. The materials of the present invention are stable in the pH range between 4 and 8 and temperatures of up to 80° C. for a time greater than 24 hours.

The thermal stability of the material can be established by thermogravimetric measurements on a thermobalance. In these measurements the weight loss is established according to the temperature of the system, these weight losses being attributed to the decomposition of the material. It is observed that the materials of the present invention can be stable up to 150° C.

DESCRIPTION OF THE FIGURES

FIG. 1. X-ray powder diffractogram corresponding to the materials object of the present invention recorded by means of a Philips X'Pert equipment.

EXAMPLES

Having generally presented the present invention and the materials containing units of formula (I) in the crystal framework of a metal-organic structure capable of promoting complete water splitting, some examples are described below that show how the generation of $H_2$ can be carried out according to the present invention.

Example 1. Photocatalytic Water Splitting Using a MOF with Formula $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ ("PyC" Refers to Py-4-$CO_2$) by Irradiation with Sunlight in Suspension in Aqueous Phase at pH 7

The material is previously prepared according to a slightly modified procedure from the state of the art (Liu, Q. et al. *Journal of the American Chemical Society* 2019, 141, 488-496) and the X-ray pattern of which corresponds to that shown in FIG. 1 and the formula of which coincides with the chemical analysis. Briefly, 1 ml of three dissolutions of $Cu(NO_3)_2 \cdot 3H_2O$ (0.2 mmol; 48.3 mg), H-pyrazole-4-carboxylic acid (0.2 mmol; 23.5 mg) and $ZrOCl_2 \cdot 8H_2O$ (0.12 mmol; 38.7 mg) are consecutively mixed in N, N-dimethylformamide (DMF) in a 20 ml glass vial to which 450 μl of acetic acid are added. The vial is hermetically sealed and placed in a preheated oven at 100° C. for 12 h. After that time, the vial is allowed to cool to ambient temperature, separating the supernatant liquid. The resulting solid is washed with DMF (3×5 ml) and then with acetonitrile (3×5 ml). The solid material is stored in acetonitrile for use thereof. 50 mg of this material are dispersed by magnetic stirring in 50 ml of distilled water and is placed inside a 70 ml Pyrex glass reactor capable of being hermetically sealed. Prior to the start of the irradiation the solution and the free volume of the reactor were purged by means of a stream of argon of 1 ml/min that was bubbled through the reactor for at least 1 hour before the start of the reaction in order to reduce the amount of $O_2$ present in the system. The system is irradiated by exposure to the beam of a solar simulator consisting of an Xe lamp with an AM 1.5 filter that simulates the solar irradiation of the earth's surface. The radiation power was 100 $mW \cdot cm^2$ and the exposed surface of the reactor was 13 $cm^2$. The distance between the exit of the beam of the solar simulator and the photoreactor was about 10 cm. The temperature of the system during radiation varied between 25 and 35° C. Exposure to simulated sunlight is carried out for 24 hours, analysing the composition of the free volume of the reactor by means of a gas chromatograph that enables the detection and quantification of the presence of $H_2$ and $O_2$. After 24 hours the values of $H_2$ and $O_2$ under these conditions were 6 and 2.5 mmol, respectively. The material $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ was stable under these reaction conditions and when the system is purged with argon after the first use until the presence of $H_2$ is not detected in the volume and then the process is repeated for another 24 hours, the same values of $H_2$ and $O_2$ production are observed as those listed above.

Example 2. Photocatalytic Water Splitting Using $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ Containing Platinum Nanoparticles as Photocatalyst by Irradiation with Sunlight in Suspension in Aqueous Phase at pH 7

Prior to the photocatalytic reaction of the material $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ containing platinum, the material is prepared starting from MOF containing units $Cu_3(Py\text{-}4\text{-}CO_2H)_{30}H$ from Example 1 wherein Pt is deposited by the photodeposition method using chloroplatinic acid. Thus, 50 mg of MOF are dispersed in water-methanol in a 3 to 1 volume ratio wherein 3 mg of chloroplatinic acid have been previously dissolved in water and introduced in a quartz tube. Next, the photocatalytic test is carried out as indicated in Example 1. After 24 hours the values of $H_2$ and $O_2$ under these conditions were 10 and 4.5 $mmol \times g^{-1}$, respectively. The material $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ with platinum nanoparticles was stable under these reaction conditions and when the system is purged with argon after the first use until the presence of $H_2$ is not detected in the volume of the photoreactor and then the process is repeated for another 24 hours, the same values of $H_2$ and $O_2$ production are observed as those listed above.

Example 3. Photocatalytic Water Splitting Using $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ Containing Platinum and Ruthenium Oxide by Irradiation with Sunlight in Suspension in Aqueous Phase at pH 7

Prior to the $H_2$ and $O_2$ generation reaction starting from water, the MOF material is prepared containing units $Cu_3(Py\text{-}CO_2)_3OH$ in turn containing nanoparticles of platinum and ruthenium oxide as cocatalysts. The preparation of Pt-$RuO_x$ is carried out by simultaneously depositing both metals starting from chloroplatinic acid and potassium perruthenate dissolved in water in a solution wherein 50 mg of MOF used in example 1 are dispersed in water methanol in a 3 to 1 volume ratio. After purging the system with argon, this mixture is irradiated with a lamp that emits visible-ultraviolet light for 4 hours. Next, the photocatalytic test is carried out as indicated in Example 1. After 24 hours the values of $H_2$ and $O_2$ under these conditions were 12 and 5.5 $mmol \times g^{-1}$, respectively. The material $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ with platinum and ruthenium nanoparticles was stable under these reaction conditions and when the system is purged with argon after the first use until the presence of $H_2$ is not detected in the reactor and then the process is repeated for another 24 hours, the same values of $H_2$ and $O_2$ production are observed as those listed above.

Example 4. Photocatalytic Water Splitting Using $[Zr_6(\mu_3\text{-}O)_4(\mu_3\text{-}OH)_4(OH)_6(H_2O)_6]\text{-}[Co_3(\mu_3\text{-}O)(\mu\text{-}PyC)_3(H_2O)_6]_2$ by Irradiation with Sunlight in Suspension in Aqueous Phase at PH 7

The flexibility in the composition of the MOF structure is illustrated by the possibility of replacing the Cu of the trispyrazolyl unit by Co. The preparation of this material is carried out following the state of the art for the preparation of the Cu compound, but substituting tris(2-carboxy)pyrazolyl copper with tris(2-carboxy)pyrazolyl cobalt and following the steps indicated in the state of the art (Liu, Q. et al. *Journal of the American Chemical Society* 2019, 141, 488-496). Thus, the procedure is as indicated in Example 1 but substituting the copper material with another similar one wherein the copper has been substituted with cobalt. The method of photocatalytic water splitting under the indicated conditions gives rise to values of $H_2$ and $O_2$ of 3 and 1.2 mmol×g$^{-1}$, respectively.

Example 5. Continuous Photocatalytic Water Splitting $Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ Deposited on a 1 $m^2$ Plate Containing 6 Modules of about 20 $cm^2$ Each One Connected in Series The material is $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$. Initially, to deposit the MOF in each module, a paste with Nafion and ethanol is prepared by manually dispersing in a mortar 100 mg of MOF with 5 ml of a commercial 5% Nafion solution in ethanol. This paste is subsequently deposited on a Teflon support spreading it with a blade that provides a very thin thickness, according to the method known as razor blade. Subsequently, the plate is dried at 100° C. for 24 h. The generation of $H_2$ is carried out by irradiation with natural sunlight in aqueous phase at pH 7, generating 400 ml of $H_2$ on a sunny day in Valencia measured under ambient conditions.

Example 6. Photocatalytic Water Splitting in the Vapour Phase Using $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_{2\ 1}$ Deposited on Plates as Described in Example 5

The generation of $H_2$ is carried out by irradiation with natural sunlight and water vapour at a temperature of 60° C., using a $N_2$ flow of 0.5 ml×min$^{-1}$ as carrier gas, obtaining 600 ml of $H_2$ measured under ambient conditions.

Example 7. Photocatalytic Water Splitting Using $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ by Irradiation with Sunlight in Suspension in Aqueous Phase at pH 7 at High Temperatures 50 mg of the material previously synthesised and the X-ray pattern of which corresponds to that shown in FIG. 1 are dispersed by means of magnetic stirring in 50 ml of distilled water and are placed inside a 70 ml glass reactor capable of being hermetically sealed. Prior to the start of the radiation the solution and the free volume of the reactor were purged by means of a stream of argon of 1 ml/min that was bubbled through the reactor for at least 1 hour before the start of the reaction in order to reduce the amount of $O_2$ present in the system. The system is irradiated by exposure to the beam of a solar simulator consisting of an Xe lamp with an AM 1.5 filter that simulates the solar irradiation of the earth's surface. The radiation power was 100 mW·cm$^2$ and the exposed surface of the reactor was 13 cm$^2$. The distance between the exit of the beam of the solar simulator and the photoreactor was about 10 cm. The temperature of the system during radiation varied between 2° and 100° C. Exposure to simulated sunlight is carried out for 24 hours, analysing the composition of the free volume of the reactor by means of a gas chromatograph that enables the detection and quantification of the presence of $H_2$ and $O_2$. After 24 hours the values of $H_2$ and $O_2$ under these conditions were 2 and 0.9 mmols of $H_2$ and $O_2$ at 100° C., respectively. The material $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ was stable under these reaction conditions and when the system is purged with argon after the first use until the presence of $H_2$ is not detected in the volume of the reactor and then the process is repeated for another 24 h the same values of $H_2$ and $O_2$ production are observed as those listed above.

Example 8. Photocatalytic Splitting of Salt Water Using $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ by Irradiation with Sunlight in Suspension in Aqueous Phase at pH 7

Next, the photocatalytic test is carried out as indicated in Example 1 using salt water. After 24 hours, the values of $H_2$ and $O_2$ under these conditions were 4 and 2.5 mmol×g$^{-1}$, respectively. The material $[[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ was stable under these reaction conditions and when the system is purged after the first use with argon until the presence of $H_2$ is not detected in the volume of the photoreactor and then the process is repeated for another 24 hours, the same values of $H_2$ and $O_2$ production are observed as those listed above.

Example 9. Photocatalytic Water Splitting Using a MOF with Formula $[Hf_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ by Irradiation with Sunlight in Suspension in Aqueous Phase at pH 7

In order to illustrate again the flexibility in the composition of the MOF materials described herein for the photocatalytic water splitting, it is possible to substitute $Zr^{IV}$ in nodal positions with $Hf^{IV}$ following the synthesis methods described in the state of the art (Liu, Q. et al. *Journal of the American Chemical Society* 2019, 141, 488-496). The material $[[Hf_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ shows an efficiency in the generation of $H_2$ by irradiation with sunlight identical to that described in Example 1. Additionally, following processes parallel to those indicated in examples 2, 3 and 4, it is possible to incorporate Pt or Pt—$RuO_2$ in the pores of the material and also substitute Cu with Co in the composition, maintaining the same structure corresponding to the X-ray diffractogram indicated in FIG. 1.

Example 10. Comparative Study of the Efficiency of $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ Compared to a Related Material $Zr(\mu_3\text{-}O)_4(\mu_3\text{-}OH)_4(BDC\text{-}NH_2)_3$ ($BDC\text{-}NH_2$: 2-Amino-1,4-Benzenedicarboxylate) Known in the State of the Art The present invention surprisingly describes the high photocatalytic activity of organic frameworks containing formula I in the generation of $H_2$. Comparison between the photocatalytic efficiency of $[Zr_6(\mu_3\text{-}O)_4(\mu_3\text{-}OH)_4(OH)_6(H_2O)_6]\text{-}[Cu_3(\mu_3\text{-}O)(\mu\text{-}PyC)_3(H_2O)_6]_2$ with that of $Zr_6(\mu_3\text{-}O)_4(\mu_3\text{-}OH)_4(BDC\text{-}NH_2)_3$ (A. Dhakshinamoorthy, Z. Li, H. García., Catalysis and photocatalysis by metal organic frameworks, *Chem. Soc. Rev.* 2018, 47, 8134-8172) demonstrates inventive step. Thus, the material corresponding to example 1 under the irradiation conditions described in that example has a production of $H_2$ and $O_2$ after 24 h of 6 and 2.5 mmol, respectively. By comparison, the similar material $Zr_6(\mu_3\text{-}O)_4(\mu_3\text{-}OH)_4(BDC\text{-}NH_2)_3$ prepared as described in the state of the art produces 0.125 and 0.031 mmol of $H_2$ and $O_2$ under the same conditions, respectively. The material $Zr_6(\mu_3\text{-}O)_4(\mu_3\text{-}OH)_4(BDC\text{-}NH_2)_3$ is prepared by mixing 2-aminoterephthalic acid (1.0 mmol) with $ZrCl_4$ (0.233 g, 1 mmol) in a Teflon-coated autoclave containing 3 ml of dimethylformamide. The autoclave is heated at a temperature of 100° C. for 24 h. The System is allowed to cool to ambient temperature and the resulting precipitate is collected, washed with dimethylformamide and introduced in a Soxhlet continuous extraction equipment using methanol as solvent. Lastly, the solid is dried in an oven at 100° C. for 24 h.

The invention claimed is:

1. A photocatalytic method for producing hydrogen starting from water comprising the use of a catalyst that is a metal organic framework characterized in that it comprises units of formula (I) in the structure thereof:

Formula (I)

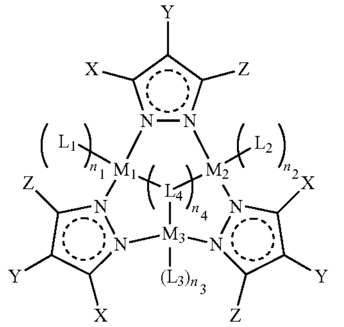

wherein $M_1$, $M_2$ and $M_3$ are metal cations selected from the list consisting of Co and Cu, wherein $M_1$, $M_2$ and $M_3$ are equal to each other;

X is a substituent selected from the list consisting of: H, $CH_3$, $OCH_3$, $SO_3^-$, F, Cl, Br, I, $NH_2$, and $CF_3$;

Y is $COO^-$;

Z is a substituent selected from the list consisting of: H, $CH_3$, $OCH_3$, $SO_3^-$, F, Cl, Br, I, $NH_2$, and $CF_3$;

$L_1$, $L_2$, $L_3$ and $L_4$ are groups independently selected from the list consisting of: $O_2^-$, $OH^-$, $H_2O$ and halide;

$n_1$, $n_2$, $n_3$ and $n_4$ are numbers independently selected from 0 and 1, and contacting the metal-organic framework, with water in liquid or vapor state and in the presence of sunlight or artificial light.

2. The photocatalytic method, according to claim 1 wherein X is H and Z is other than H.

3. The photocatalytic method, according to claim 1 wherein X and Z are H.

4. The photocatalytic method, according to claim 1, wherein $L_1$, $L_2$, $L_3$ and $L_4$ are independently selected from $Cl^-$ and $OH^-$.

5. The photocatalytic method, according to claim 1, wherein $M_1$, $M_2$ and $M_3$ are Cu cations; X and Z are H, Y is —$CO_2H$ and $L_1$, $L_2$, $L_3$ and $L_4$ is $Cl^-$, $OH^-$ or is not present.

6. The photocatalytic method, according to claim 1, wherein the proportion of units of formula (I) in the structure is between 15% and 100%, in moles with respect to the total of ligands.

7. The photocatalytic method, according to claim 1, wherein metal-organic framework contains one or more species housed in the pores which act as cocatalysts favouring the $H_2$ photocatalytic generation reaction wherein said cocatalysts are selected from the list consisting of:

nanoparticles of the metals platinum, gold, iridium, silver, rhodium and nickel, palladium and combinations thereof, nanoparticles of metal oxides that are selected from cobalt, copper, ruthenium, molybdenum, strontium, zirconium and combinations thereof,- nanoparticles of metal chalcogenides based on sulphides, selenides or tellurides combined with molybdenum, cadmium, zinc, lead, indium, copper, tungsten and combinations thereof,- and metal complexes wherein the metal is chrome, manganese, iron, cobalt, nickel, copper, ruthenium, rhodium, palladium, silver, platinum and iridium and the organic ligand contains amine-, imine- or heterocyclic-type nitrogen atoms, and combinations thereof.

8. The photocatalytic method according to claim 1 wherein the metal-organic framework is deposited in the form of a thin film between 1 and 20 microns thick and a bed of water between 0.5 and 12 cm thick is made to flow over said film at a temperature between 4 and 40° C. and at a rate between 0.1 and 2 ml/hour, said film being exposed to sunlight or artificial light.

9. The photocatalytic method according to claim 1 wherein the metal-organic framework is deposited in the form of a thin film several microns thick and a flow of water vapor at a temperature between 10° and 150° C. is made to flow over said film at a rate between 0.1 and 2 ml/hour and wherein said film is exposed to sunlight or artificial light.

* * * * *